T. ARBEITER.
WHEEL GUARD FOR SULKY OR GANG PLOWS.
APPLICATION FILED DEC. 22, 1909.
985,492.
Patented Feb. 28, 1911.
2 SHEETS—SHEET 1.
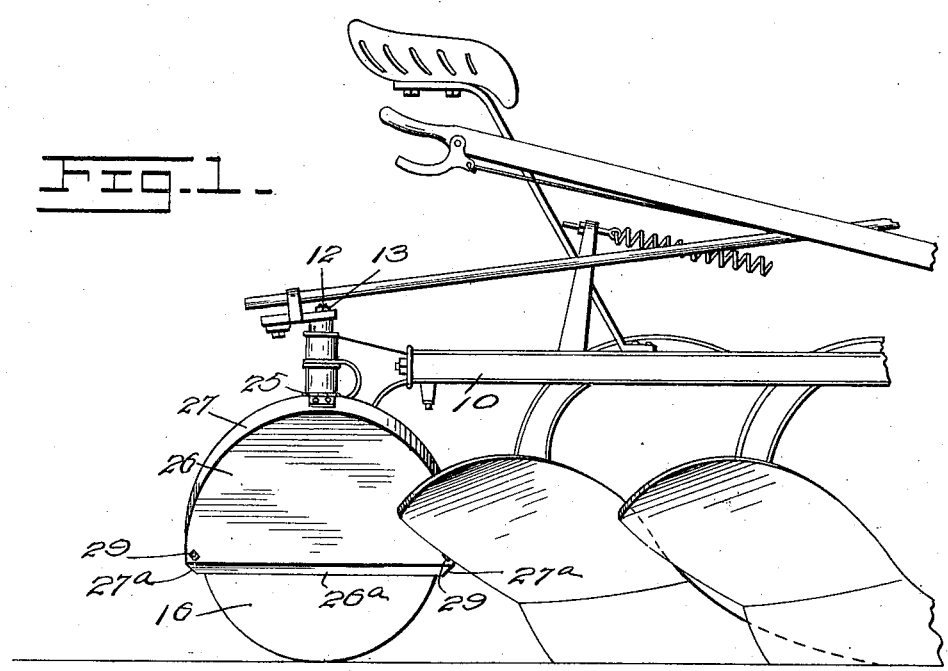
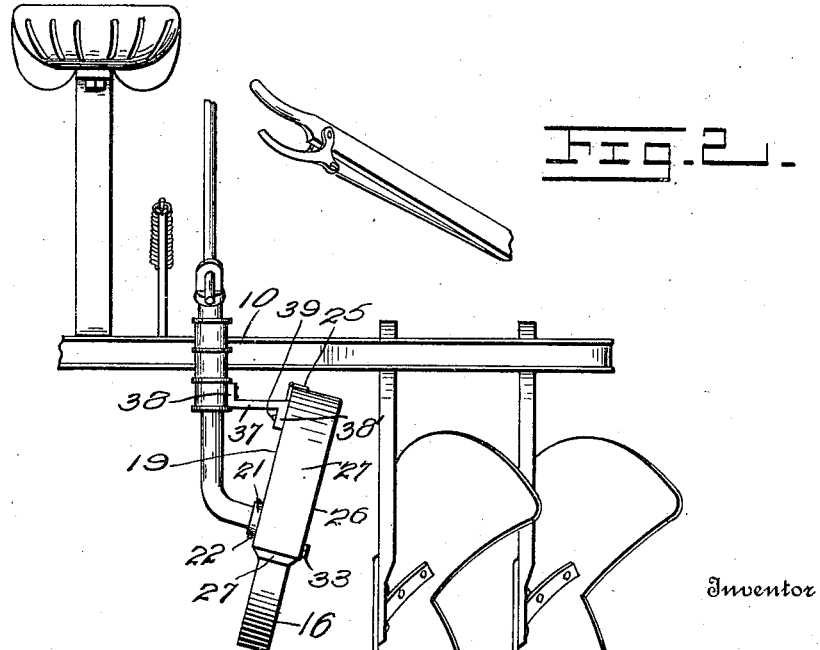

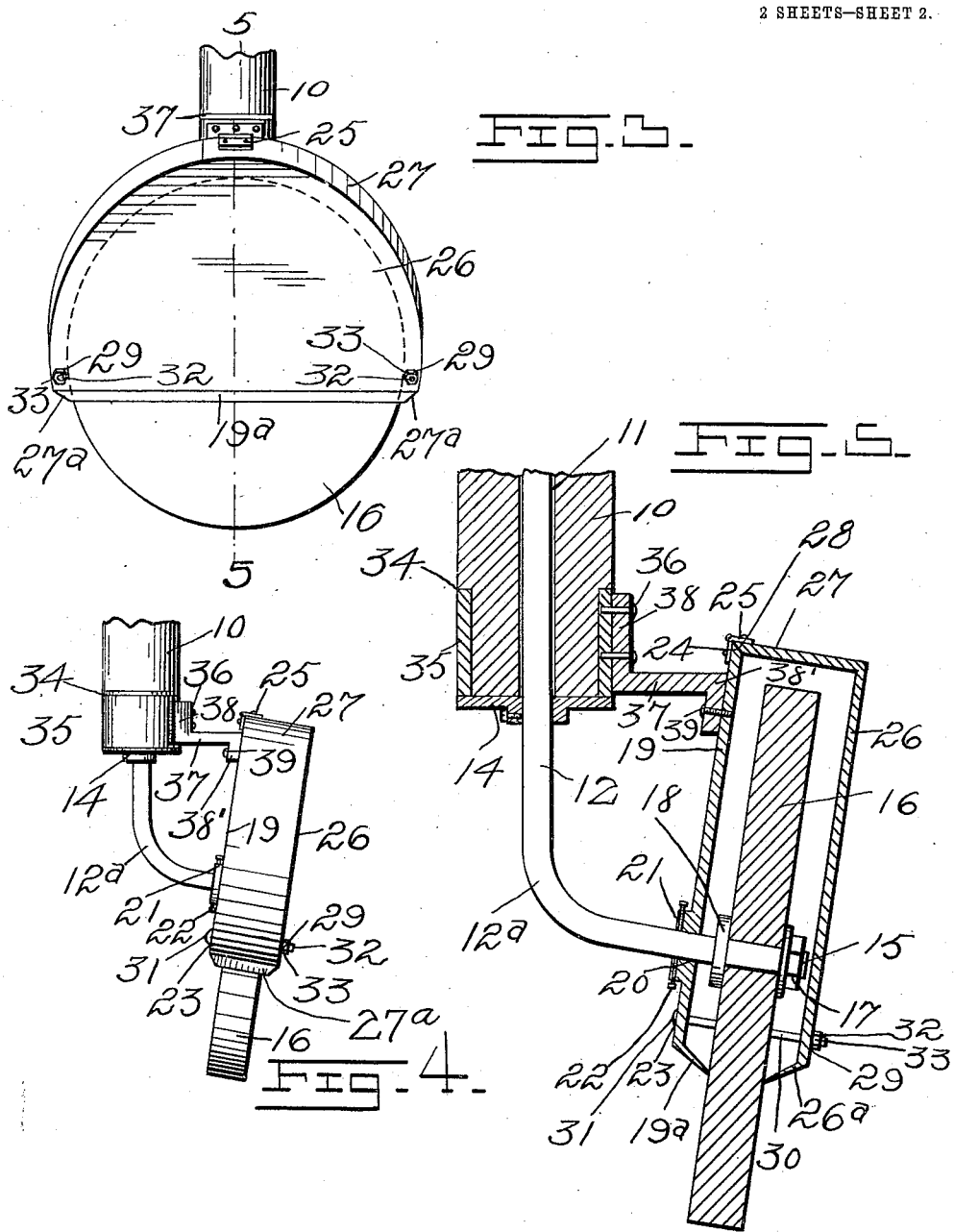

UNITED STATES PATENT OFFICE.

TRAUGOTT ARBEITER, OF DOLTON, SOUTH DAKOTA.

WHEEL-GUARD FOR SULKY OR GANG PLOWS.

985,492.

Specification of Letters Patent. Patented Feb. 28, 1911.

Application filed December 22, 1909. Serial No. 534,514.

*To all whom it may concern:*

Be it known that I, TRAUGOTT ARBEITER, a citizen of the United States, residing at Dolton, in the county of Turner and State of South Dakota, have invented certain new and useful Improvements in Wheel-Guards for Sulky or Gang Plows, of which the following is a specification.

This invention has relation to certain new and useful improvements in wheel guard for sulky or gang plows.

The object of my invention is to provide a means whereby the rear wheel of a sulky or gang plow may be protected from dirt, weeds, or the like, which are liable to gather on the wheel and clog its movement.

A further object is to provide an easy means for gaining access to the interior of the wheel housing when repairs, oiling, or the like are required.

Other objects and advantages will be apparent from the following description, and it will be understood that changes in the specific structure shown and described may be made within the scope of the claims without departing from the spirit of the invention.

In the drawings forming a part of this specification, and in which like numerals of reference indicate similar parts in the several views, Figure 1 is a side elevation of the rear part of a sulky or gang plow with my wheel guard attached to the rear wheel thereof. Fig. 2 is a rear elevation of the same. Fig. 3 is an enlarged side elevation of my attachment. Fig. 4 is an enlarged end elevation of my attachment. Fig. 5 is a sectional view along the line 5—5 of Fig. 3.

Referring to the drawings, 10 is the beam of a sulky or gang plow, in the rear end of which is the vertically disposed bearing 11, adapted to loosely receive the shaft 12. The upper extremity of the shaft 12 projects above the beam 10, and is screw threaded, a nut 13 being engaged therewith. Immediately below the beam 10, and bearing upwardly against it, is the collar 14, integral with the shaft 12.

The lower extremity of the shaft 12 is bent through an angle, as at 12$^a$, its lower extremity being screw threaded as at 15. Revolubly mounted on the lower end of the shaft 12 is the solid wheel 16, which serves to support the rear of a plow. The wheel 16 is held against lateral movement on the shaft 12 by the nut 17, engaging with the screw threads 15, and the collar 18 mounted on the shaft 12.

A sheet of metal 19 provided with a circular opening 20 below its vertical center, and a collar 21 about said opening and integral with said sheet, is fastened to the shaft 12 by bolts 22 passing through the collar 21. The shaft 12 passes through the opening 20 as shown in Fig. 5. The sheet of metal 19 may be either in the form of a segment of a circle larger than a semicircle, or rectangular, as desired, the shape shown in the drawings being believed to be preferable. The lower edge of the sheet of metal 19 is flanged inwardly as at 19$^a$, its extremity being bluntly pointed and impinging against the adjacent surface of the wheel 16. The other edges of the sheet of metal are beveled as at 24.

Placed against the beveled edges 24 of the sheet of metal 19, are the correspondingly beveled edges 28 of the flange 27 of the sheet of metal 26, a hinge 25 joining the flange 27 to the side sheet of metal 19. The lower edge of the sheet of metal 26 is flanged in opposite direction to the flange 19$^a$, as at 26$^a$, and the flange 27 is also bent inwardly at its lower extremities as at 27$^a$, the edges thereof being bluntly pointed and impinging against the wheel 16 in the same manner as the flange 19$^a$. This sheet of metal 26 is of similar shape to the sheet 19, and the two sheets, together with the flange 27, are designed to constitute a housing for the wheel 16, and by its construction and operation to protect the bearings of said wheel from dirt and weeds, the edges 19$^a$ and 26$^a$ scraping off the dirt which adheres to the wheel 16.

Near the lower and outer edge of the sheet of metal 19, are the two holes 23 and placed opposite them in the sheet 26 are the two holes 29. Passed through each hole 23 and the hole 29 corresponding, is the bolt 30, provided at one end with a head 31, and screw threaded at the other end, as at 32, a nut 33 being engaged therewith. By the construction of the hinge and bolts, access to the interior of the wheel housing may be gained by unscrewing the nuts 33, removing the bolts 30 and revolving the outer portion of the housing on the hinge 25.

Revolubly mounted in the recess 34 of the beam 10, is the collar 35, to which is fastened, by means of bolts 36, the flange 38 of the bracket 37, which has an oppositely turned lug 38′, through which is passed a bolt 39, said bolt engaging with the sheet of metal 19 and thereby holding the housing rigid.

In cases where the shaft 12 is held rigid in the beam 10, the revoluble collar may be dispensed with and the bracket 37 attached directly to the beam 10. If, however, it is desired, the bracket 37 may be entirely dispensed with, but I prefer to use some such brace member for the housing.

It will be seen that the housing I have provided need not be confined to rear plow wheels, but may be attached to any machine whatsoever, where owing to the function of said machine, its wheels are liable to become clogged with dirt, weeds, or the like.

What is claimed is:

1. A wheel housing comprising a plate having an axle receiving opening therein, a wheel engaging flange carried by the plate, a flange hinged to the plate, a second plate carried by the second flange, said hinge being arranged for movement of the second plate toward and away from the first named plate, a wheel engaging flange carried by the second plate, wheel engaging flanges carried by the ends of the second named flange, and means for holding the two plates against separation.

2. A wheel housing comprising a plate having an axle receiving opening therein, a wheel engaging flange carried by the plate, a flange hinged to the plate, a second plate carried by the flange, said hinge being arranged for movement of the second plate toward and away from the first named plate, a wheel engaging flange carried by the second plate, wheel engaging flanges carried by the ends of the second named flange, means for holding the two plates against separation, and means carried by the first named plate for attaching the housing.

In testimony whereof I affix my signature, in presence of two witnesses.

TRAUGOTT ARBEITER.

Witnesses:
 JOHN T. SCHROEDER,
 FRED TILLMAN.

---

Copies of this patent may be obtained for five cents each, by addressing the "Commissioner of Patents, Washington, D. C."